H. P. CORNE.
DISK HARROW.
APPLICATION FILED MAY 18, 1910.
989,338.
Patented Apr. 11, 1911.
2 SHEETS—SHEET 1.
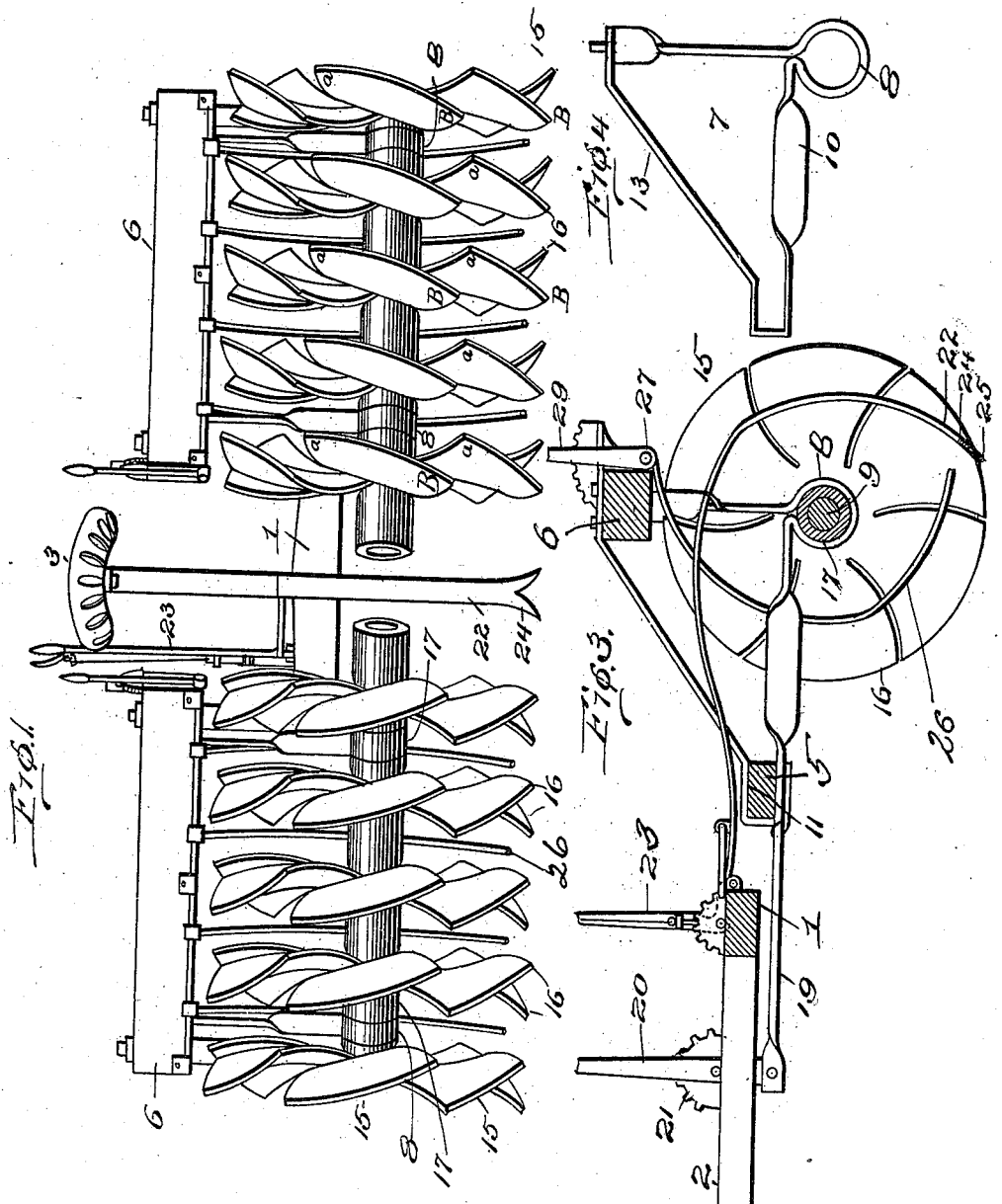
Witnesses
H. K. Parsons.
M. E. Moore
Inventor
Henry P. Corne
By
Attorney

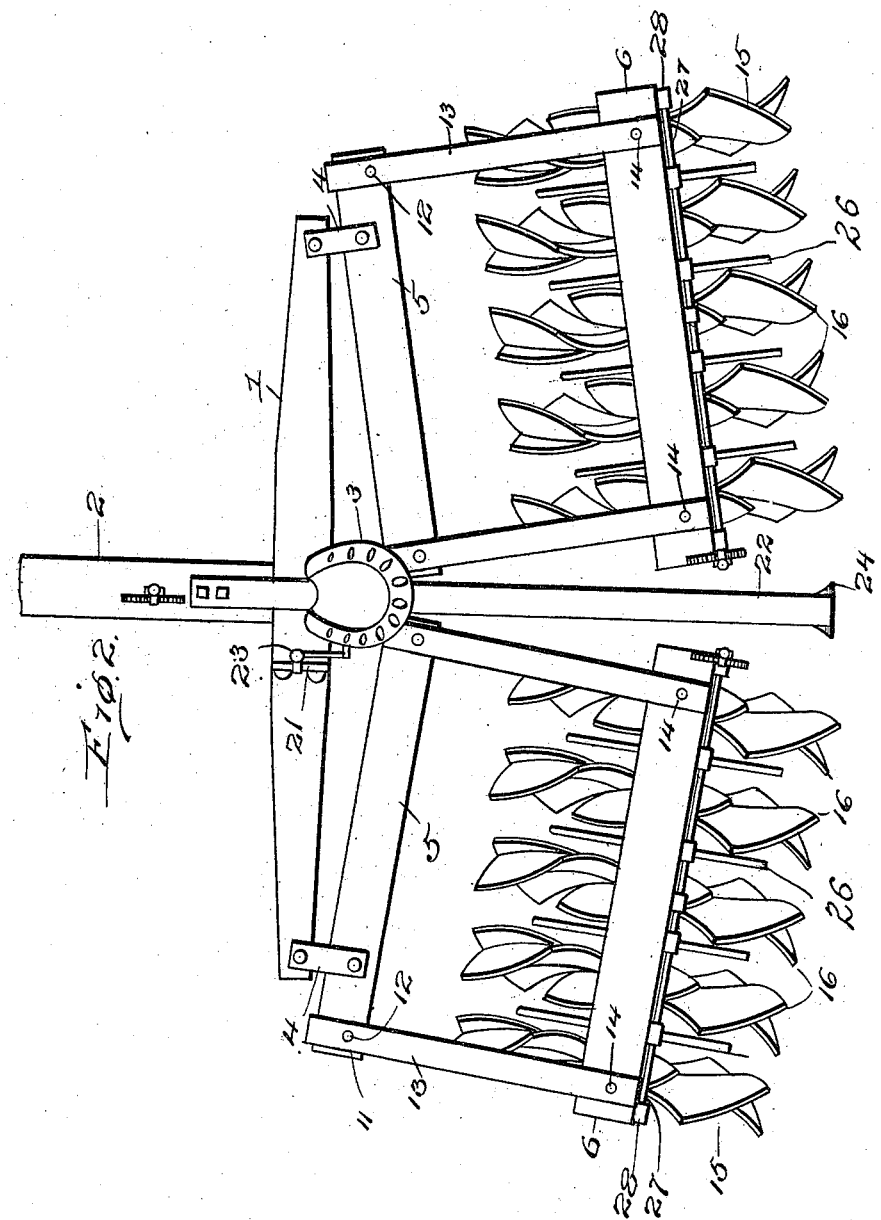

UNITED STATES PATENT OFFICE.

HENRY P. CORNE, OF WINDSOR, ILLINOIS.

DISK HARROW.

989,338. Specification of Letters Patent. Patented Apr. 11, 1911.

Application filed May 18, 1910. Serial No. 562,023.

*To all whom it may concern:*

Be it known that I, HENRY P. CORNE, a citizen of the United States, residing at Windsor, in the county of Shelby and State of Illinois, have invented certain new and useful Improvements in Disk Harrows, of which the following is a specification.

My invention relates to improvements in disk harrows, and the object of my invention is the provision of an improved form of disk harrow having improved cutting disks which will so pulverize the soil as to greatly facilitate the cross-harrowing thereof by implements following directly behind the disk harrow.

Another object of the invention is the provision of a harrow having improved disks which will pulverize the soil much more thoroughly than the forms now in use, said disks being adjustably secured to the harrow frame, while the further object of the invention is the provision in connection with said improved adjustable disks of cleaners therefor and a center cutter of novel construction located between the gangs.

To attain the desired objects, my invention consists in a disk harrow having improved disks, while the invention further consists in the novel features of adjustment and the cleaning and center cutting attachments, and further in the combination and arrangement of said parts substantially as hereinafter described and as illustrated in the accompanying drawings.

Figure 1 represents a rear elevation of my complete harrow. Fig. 2 represents a top plan view thereof. Fig. 3 represents a vertical sectional view through the axle and transverse bars of the harrow, the disk and adjusting mechanism being shown in elevation, and, Fig. 4 represents a detailed view of the end bracket which secures the parts of each gang together.

In the drawings, in which similar characters of reference are employed to denote corresponding parts in the several views, the numeral 1 designates the frame bar of my harrow, having secured thereto the tongue or draft bar 2 and having supported thereon the seat 3 of the operator. Pivotally secured to the ends of the frame bar by the links 4 are the bars 5 which form the front of the disk bearing gangs or frames, said frames having a top bar 6 secured to the other bar by the brackets shown best in Fig. 4 and designated as a whole by the numeral 7. Said brackets are located near each end of the frame and are formed from a single strip or bar of metal, said bar having one end passing down through and secured in the bar 6 with its narrow edge toward the front, the strip being twisted half around and bent to form the loop 8 which may be employed either as a bearing for the axle 9 upon which the disks are mounted or may receive a suitable journal box, while the strip is again twisted to form the forwardly extending portion 10 with its edges in a vertical plane to withstand the greatest strain, the material then being twisted and bent to form a loop 11 in which the bar 5 is engaged and secured by the bolts or rivets 12, the strip then passing upward in the portion 13 and being secured to the top bar 6 by suitable means 14. From the foregoing description taken in connection with figure 4 it will be seen that the bracket 7 is of substantially triangular configuration having the loops 8 and 11 formed therein and that I provide a strong, durable bracket which will hold all the parts in their correct position.

Journaled in the loops 8 is the shaft 9 having mounted thereon my improved disks 15 having a series of shear cutting blades 16 held apart by the customary spacing collars 17, nuts 18 engaging the ends of the axle to prevent the displacement of the disks. It will be seen that the blades 16 are bent at an angle to the disks proper and that at the same time the blades curve outward while their front points are in alinement with each other and their rear points also in alinement with the other rear points, and that therefore the cut made by each disk is substantially the same as would be made by a broad wheel having a series of diagonally disposed blades secured on its periphery. A great advantage is gained by this construction of the disks as in this manner they reach more of the soil and pulverize it much more thoroughly than do the disks now in common use, while at the same time they leave the soil gone over at at angle to the direction in which the harrow is moving, it therefore being possible to follow directly behind with an ordinary harrow and cross-harrow the field instead of necessitating the waiting to cross-harrow the field until it had been gone over entirely with the disks as is at present the case.

In order that the angle at which the disks may be adjusted to accord with the desires of the operator, I pivotally secure to the inner end of each of the bars 5 the lever 19, the other end of the levers 19 being pivotally secured to the controlling lever 20 carried by the tongue 2, there being a suitable locking means 21 for securing said lever 20 in adjusted position and the movement of the lever swinging the frames or gangs on the links 4 as pivots and thus adjusting their angle with reference to the frame bar and direction of movement of the harrow.

To prevent there being a ridge left between the soil cut by the two gangs when swung at an angle, I secure to the frame bar my improved center cutter 22 adapted to be thrown into operative position by the lever 23, said cutter curving down between the two gangs and having a bifurcated lower end 24 bent into substantially the form of a shovel plow and having beveled edges 25 to aid in cutting out said center ridge.

To prevent the space between the disks from being clogged by brush, weeds or other substances, I secure to the top bars 6 my improved clearers 26, said clearers being secured to the rods 27 which are rotatably mounted in the brackets 28 carried by the top bar 6, there being one of said rods secured to each of the gangs and a clearer located between each of the disks. Said clearers curve downward and then rearwardly around the axle 9 while they are also laterally curved to permit them to rest between the disks without interfering in the least therewith. It will be seen that the presence of said clearers prevents weeds, mud or other foreign substance from clogging the disks and packing around the axles 9, while to further aid in preventing the clogging of the disks I secure to each rod 27 an adjusting lever 29 which serves to rock said rod and swing the clearers between the disks, thus scraping and shaking off any material near the outer edges thereof.

From the foregoing description taken in connection with the drawings the construction and operation of my harrow will be clearly understood and its advantages be readily appreciated, and it will be seen that I have provided a strong and durable harrow having improved disks which will pulverize the soil much more efficiently than the straight or plane disks now in common use, and further that I have provided improved adjustable frames in which said disks are mounted and which aid in adjusting the angle of the cut of the disks and that on account of said angle of cut of the disks the field may be cross-harrowed by a harrow following in the path of my improved disk harrow which at all times makes its cuts at an angle to the direction of movement of the machine.

It will further be observed that on account of the slight curve of the blades and their angular arrangement they tend to move the earth laterally outward and turn the same in the manner of a plow, thus both cutting, breaking and turning the clods of the soil.

I claim:

1. A harrow, comprising a frame bar, links pivotally secured to the outer ends thereof, bars pivoted to the free end of said links, triangular brackets secured to the bars, a top bar secured to the brackets, an axle journaled in bearing formed integral with the brackets, cutter blades mounted on said axle, adjustable clearers between the blades, a lever pivotally secured to the frame bar, and connections between said lever and the bars for adjusting said bars and thus the gangs of which they are a part on the pivotal connections of the links.

2. In a harrow, the combination with a frame, of bars pivotally secured thereto, triangular brackets carried by said bars, a top bar supported by said brackets, an axle having its ends journaled in said brackets, disks carried by the axle, and clearers carried by the top bar and curving around the axle and projecting rearwardly thereof for preventing clogging of the disks.

In testimony whereof I affix my signature, in presence of two witnesses.

HENRY P. CORNE.

Witnesses:
BRAZ D. TULL,
GUY C. FRAKER.